United States Patent
Hottenbach et al.

(10) Patent No.: US 10,823,048 B2
(45) Date of Patent: Nov. 3, 2020

(54) TURBINE HOUSING FOR A MULTI-FLOW TURBINE

(71) Applicant: BorgWarner Inc., Auburn Hills, MI (US)

(72) Inventors: Peter Hottenbach, Flonheim (DE); Henning Scheel, Kaiserslautern (DE); Rainer Wickert, Schönborn (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/288,883

(22) Filed: Feb. 28, 2019

(65) Prior Publication Data

US 2020/0277891 A1 Sep. 3, 2020

(51) Int. Cl.
*F02B 37/02* (2006.01)
*F04D 29/40* (2006.01)
*F01D 17/10* (2006.01)
*F02B 37/18* (2006.01)

(52) U.S. Cl.
CPC .......... *F02B 37/025* (2013.01); *F01D 17/105* (2013.01); *F02B 37/186* (2013.01); *F04D 29/403* (2013.01)

(58) Field of Classification Search
CPC ........ F02B 37/00; F02B 37/025; F02B 37/12; F02B 37/18; F02B 37/183; F02B 37/186; F02B 37/22; F01D 17/105; F01D 17/141; F01D 17/165; F01D 17/18; F01D 9/026; F01D 25/24; F04D 29/40; F04D 29/403; Y02T 10/144; F02C 6/12
See application file for complete search history.

(56) References Cited

U.S. PATENT DOCUMENTS

| | | | |
|---|---|---|---|
| 8,585,012 B2 * | 11/2013 | Labataille | F16K 37/00 251/129.04 |
| 2011/0302917 A1 * | 12/2011 | Styles | F02B 37/025 60/602 |
| 2013/0149114 A1 * | 6/2013 | Kohler | F01D 17/105 415/145 |
| 2019/0072030 A1 | 3/2019 | Walkingshaw et al. | |

FOREIGN PATENT DOCUMENTS

| | | |
|---|---|---|
| DE | 102006058102 A1 | 6/2008 |
| DE | 102007025437 A1 | 12/2008 |
| DE | 102007034235 A1 | 1/2009 |

(Continued)

OTHER PUBLICATIONS

English language abstract and machine-assisted English translation for DE 10 2006 058 102 extracted from espacenet.com database on Jul. 25, 2019, 18 pages.

(Continued)

*Primary Examiner* — Jesse S Bogue
*Assistant Examiner* — Loren C Edwards
(74) *Attorney, Agent, or Firm* — Howard & Howard Attorneys PLLC

(57) ABSTRACT

The invention relates to a turbine housing for a multi-flow turbine with a first spiral and a second spiral. The first spiral comprises a first side conduit and the second spiral comprises a second conduit, wherein the first side conduit and the second side conduit are fluidically connected to one another in a connection area.

16 Claims, 6 Drawing Sheets

(56) References Cited

FOREIGN PATENT DOCUMENTS

| DE | 102015122355 A1 | 6/2017 |
|----|-----------------|---------|
| DE | 102016103145 A1 | 8/2017 |
| DE | 202018101705 U1 | 4/2018 |
| EP | 3409917 A1 | 12/2018 |
| WO | 2009012989 A1 | 1/2009 |

OTHER PUBLICATIONS

English language abstract and machine-assisted English translation for DE 10 2007 025 437 extracted from espacenet.com database on Jul. 25, 2019, 13 pages.
Machine-assisted English language abstract and machine-assisted English translation for DE 20 2018 101 705 extracted from espacenet.com database on Jul. 25, 2019, 44 pages.
English language abstract and machine-assisted English translation for WO 2009/012989 extracted from espacenet.com database on Jul. 25, 2019, 10 pages.
Machine-assisted English language abstract and machine-assisted English translation for DE 10 2007 034 235 extracted from espacenet.com database on Mar. 28, 2019, 14 pages.
Machine-assisted English language abstract for DE 10 2015 122 355 extracted from espacenet.com database on Mar. 28, 2019, 2 pages.
Machine-assisted English language abstract and machine-assisted English translation for DE 10 2016 103 145 extracted from espacenet.com database on Mar. 28, 2019, 24 pages.

\* cited by examiner

TURBINE HOUSING FOR A MULTI-FLOW TURBINE

FIELD OF THE INVENTION

The present invention relates to a turbine housing for a multi-flow turbine and to a corresponding multi-flow turbine and a turbocharger with a multi-flow turbine.

BACKGROUND OF THE INVENTION

More and more vehicles of the newer generation are provided with charging devices in order to meet the requirement goals and the legal requirements. In the development of charging devices, it is necessary to optimize the individual components as well as the system as a whole with regard to their reliability and efficiency.

Known exhaust gas turbochargers comprise a turbine with a turbine wheel which is driven by the exhaust gas of the internal combustion engine. A compressor with a compressor wheel which is arranged with the turbine wheel on a common shaft compresses the drawn-in fresh air for the engine. This increases the amount of air and/or oxygen available to the engine for the combustion. This, in turn, results in a performance increase of the internal combustion engine. In particular, multi-flow turbines are also known in the prior art which are used, for example, for six-cylinder engines.

Known multi-flow turbines, for example, dual volute turbines or twin-scroll turbines have the disadvantage that under certain operating conditions, for example, as of a certain speed, the separation into two spirals has a negative effect on the performance of the turbocharger. In order to eliminate this problem, the providing of overflow areas is known from the prior art in which the exhaust gases can flow from the one spiral into the other spiral and in the inverse direction. Furthermore, it is known that these overflow areas can be opened and closed in a variable manner via linear positioning devices. The course of the flow between the two spirals is disadvantageous in the known multi-flow turbines with an overflow area.

Accordingly, the present invention has the goal of making available a turbine housing for a multi-flow turbine and a corresponding multi-flow turbine with an optimized flow course between the spirals.

SUMMARY OF THE INVENTION

The present invention relates to a turbine housing for a multi-flow turbine according to claim 1 and to a corresponding multi-flow turbine according to claim 7 and a turbocharger with a multi-flow turbine according to claim 15.

The turbine housing according to the invention for a multi-flow turbine comprises a first spiral and a second spiral. The first spiral has a first side conduit and the second spiral has a second side conduit. The first side conduit and the second side conduit are fluidically connected to one another in a connection area. The special flow guidance via the side conduits generates a purposeful flow into and through the connection area and from the first into the second spiral and in the inverse direction when the valve is open, the valve closing body of which is arranged in the closed state in the connection area. This optimized flow guidance in the turbine housing brings about a reduction of the pressure drop when the valve is open, in particular in the range of the normal output of the engine and therefore results in an improvement of the efficiency of a turbine with a turbine housing according to the invention. Furthermore, the mass flow of exhaust gas through the fluidic connection can be adapted to every degree of opening of the valve via the shape of the valve closing body of the valve and almost independently of the connection area.

In some embodiments, the first side conduit can exit in the direction of flow in front of the connection area out of the first spiral and reenter into the first spiral after the connection area, and the second side conduit can exit in the direction of flow in front of the connection area out of the second spiral and reenter back into the second spiral after the connection area.

In embodiments which can be combined with all previously described embodiments, the first side conduit, the second side conduit and the connection area can form an X-shaped conduit area together in the turbine housing. Such a conduit guidance optimizes the flow course for the overflow area as well as the inflow and removal of the exhaust gases into and out of the overflow area.

In embodiments which can be combined with all previously described embodiments, the first side conduit and/or the second side conduit can be separated at least partially by a housing part of the turbine housing from the first spiral and/or from the second spiral. Alternatively, the first side conduit and/or the second side conduit can be fluidically connected along their entire length to the first spiral and/or to the second spiral.

In embodiments which can be combined with all previously described embodiments, a valve area for receiving a valve closing body can be formed in the connection area.

In embodiments which can be combined with all previously described embodiments, a bypass opening can be arranged in the connection area. Therefore, the connection area of the turbine housing according to the invention serves not only as a connection between the two spirals but is at the same time also part of a bypass arrangement of the turbine housing or of a turbine with a corresponding turbine housing. Therefore, it is advantageously possible to regulate both an overflow area between the two spirals and a bypass opening with only a single valve and a single actuator for the valve. A valve seat can be constructed around the bypass opening.

In embodiments which can be combined with all the previously described embodiments, the turbine housing can furthermore comprise a through passage for supporting a valve spindle. Based on the special design of the turbine housing, the alignment of the through passage can be selected relatively freely in comparison to known solutions. On the other hand, the alignment of the spindle relative to the valve closing body can also be freely made as a result, since the movement plane of the spindle is independent of the orientation of the closing body. This entails advantageous degrees of freedom for the design process of the turbine housing.

The invention also comprises a multi-flow turbine for an exhaust gas turbocharger with a turbine wheel and a bypass arrangement. The turbine according to the invention comprises a turbine housing according to any one of the previously described embodiments.

In some embodiments, the bypass arrangement can comprise a valve. In particular, the valve can be a flap valve. The valve can comprise a valve closing body and a spindle. A lever arm can be arranged between the spindle and the valve closing body. In particular, the lever arm can be welded to the valve closing body. The valve closing body can extend in a closed position of the valve through a bypass opening into the connection area of the turbine housing and interact with a valve area in order to suppress an overflow of exhaust gases from the first spiral into the second spiral. The valve closing body can have an annular sealing surface which interacts in the closed position of the valve with a valve seat of the turbine housing in order to close the bypass opening. The valve closing body can be constructed to be partially hollow. The valve closing body can comprise a projection on a side facing away from the connection area. The projection can extend, for example, orthogonally from a side of the valve closing body, which side faces away from the bypass opening, and serve as a stop for the lever arm during the assembly of the valve. In this function, the projection serves, on the one hand, for the correct positioning in the sense of the determination of the position of the valve closing body. On the other hand, the projection helps during the connection of the lever arm to the valve closing body, for example, when the two structural components are welded to one another, to secure the position of the valve closing body relative to the lever arm. Therefore, the projection facilitates the assembly and prevents assembly errors.

In embodiments of the multi-flow turbine which can be combined with all previously described embodiments, the valve can be continuously adjusted from a closed position to an open position.

Furthermore, in embodiments of the multi-flow turbine which can be combined with all previously described embodiments, the bypass arrangement can comprise an actuator for actuating the valve.

The invention furthermore comprises a multi-flow turbocharger with a compressor and a turbine according to any one of the previously described embodiments.

Other details and features of the invention are described in the following, using the figures.

DETAILED DESCRIPTION

Exemplary embodiments of the turbine housing 100 according to the invention and the turbine 10 according to the invention, respectively, are described in the following using the figures.

Figure 1:
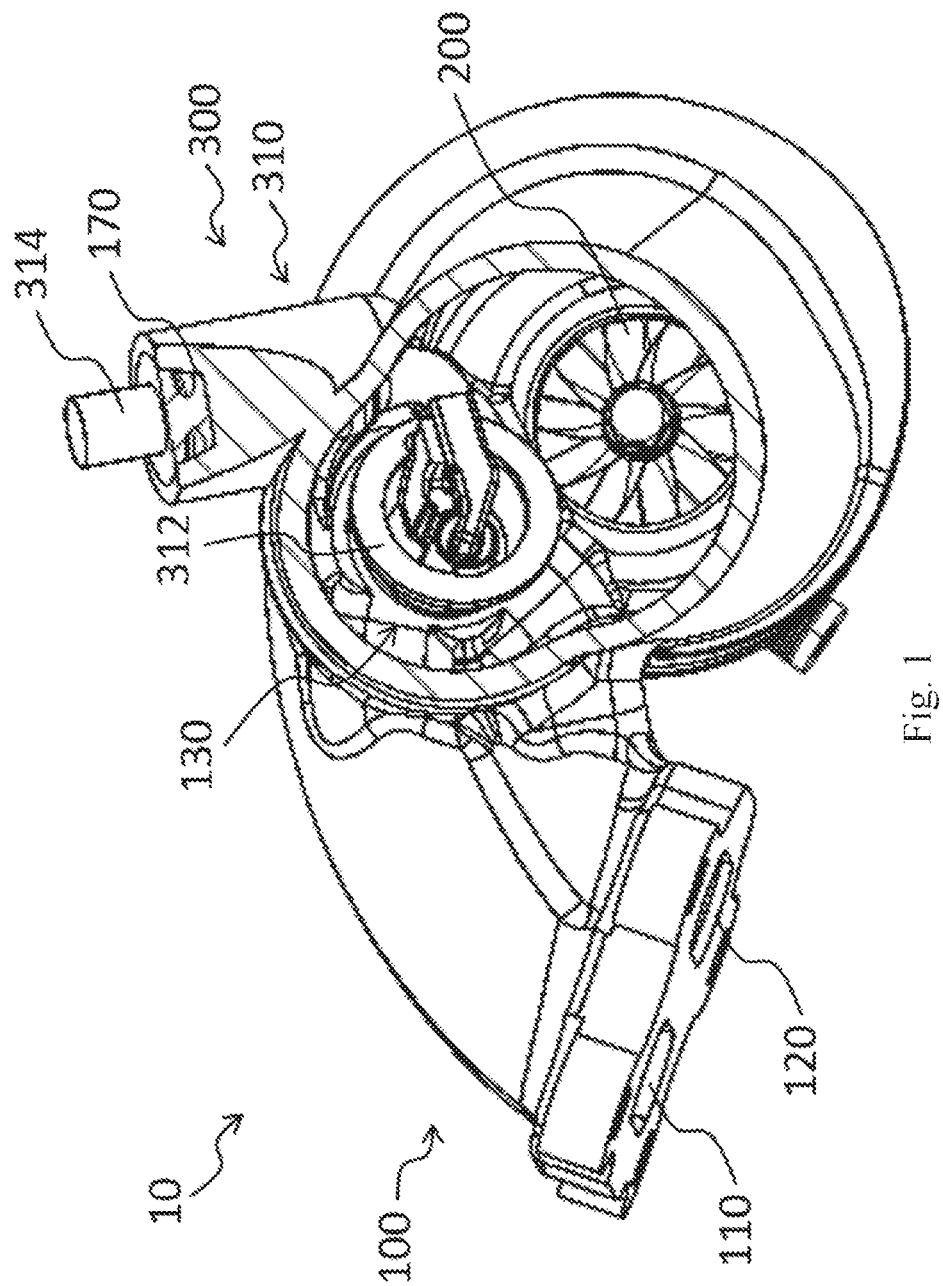
FIG. 1 shows a view with a partial section of a first exemplary embodiment of the turbine housing according to the invention and of the turbine according to the invention, respectively.

FIG. 1 shows a multi-flow turbine 10 according to the invention with a turbine housing 100 according to the invention. The turbine 10 comprises a bypass arrangement 300 with a valve 310 which turbine will be discussed in detail, later. The turbine housing 100 comprises a first spiral 110 and a second spiral 120. The turbine housing 100 is discussed in detail in the following with reference made to FIG. 4 and FIG. 5, wherein the flow course through the conduits in the turbine housing 100 is shown for better clarity in FIG. 4 and in FIG. 5. As can be seen from FIG. 4 and FIG. 5, the first spiral 110 comprises a first side conduit 112 and the second spiral 120 comprises a second side conduit 122. The first side conduit 112 and the second side conduit 122 extend along a part of the first spiral 110 and of the second spiral 120. The first side conduit 112 and the second side conduit 122 are fluidically connected to one another in a connection area 130. Therefore, the connection area 130 constitutes an overflow area from the first spiral 110 into the second spiral 120 and in the inverse direction. A purposeful flow is produced into and through the connection area 130 and from the first spiral 110 into the second spiral 120 and in the inverse direction by the special flow guidance via the side conduits 112, 122 when valve 310 is open, the valve closing body 312 of which (see FIG. 5) is arranged in the closed state in the connection area 130 (see FIG. 1). This optimized flow guidance in the turbine housing 100 brings about the reduction of the pressure drop from the exposed spiral in contrast to the non-exposed spiral 110, 120 when valve 310 is open, in particular in the range of the normal output of the engine, and therefore results in an improvement of the efficiency of turbine 10 with the turbine housing 100 according to the invention. Moreover, the mass flow of exhaust gases can be adapted by the fluidic connection for every degree of opening of the valve 310 and almost independently of the connection area 130, via the shape of the valve closing body 312 of valve 310.

Figure 4:
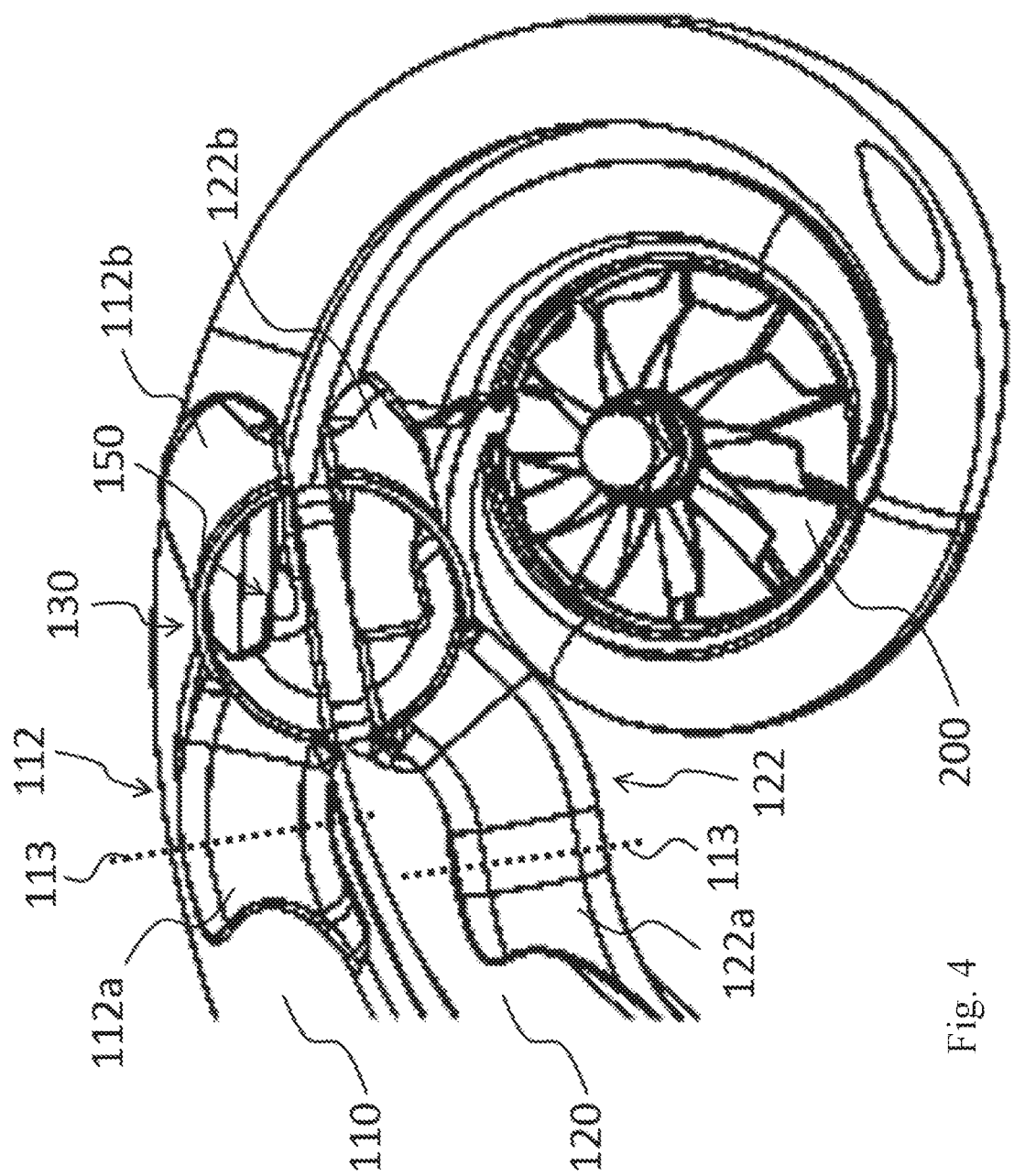
FIG. 4 shows a view of the flow conduits of a second exemplary embodiment of the turbine housing according to the invention and of the turbine according to the invention, respectively.
Figure 5:
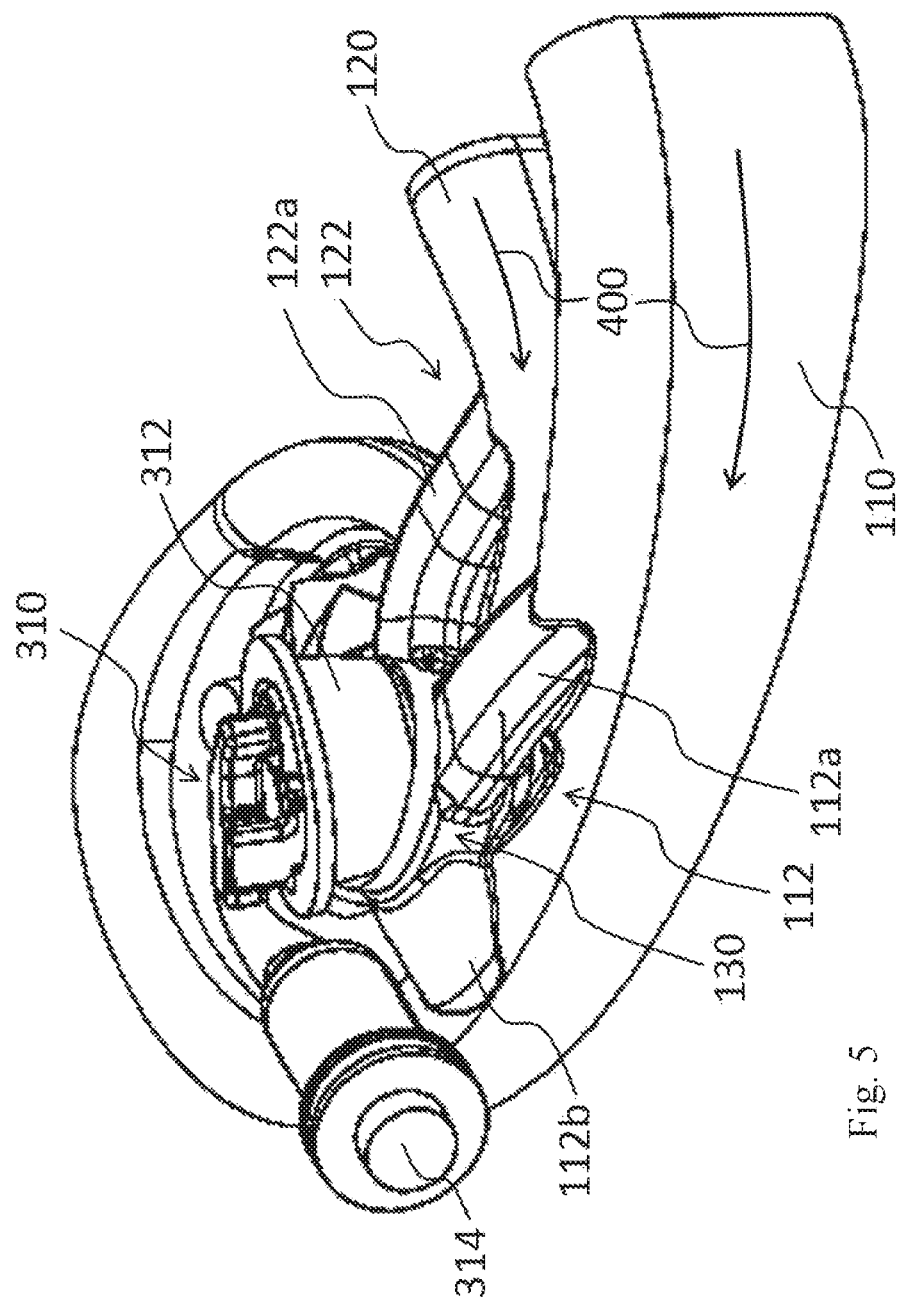
FIG. 5 shows another view of the flow conduits of the second exemplary embodiment of the turbine housing according to the invention and of the turbine according to the invention, respectively.
Figure 7:
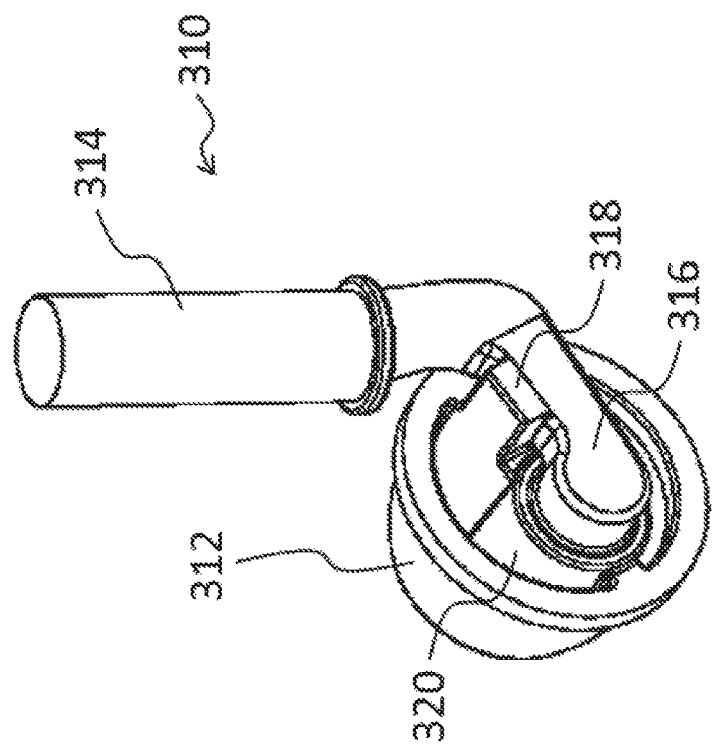
FIG. 7 shows a perspective view of the valve in FIG. 6.
Figure 6:
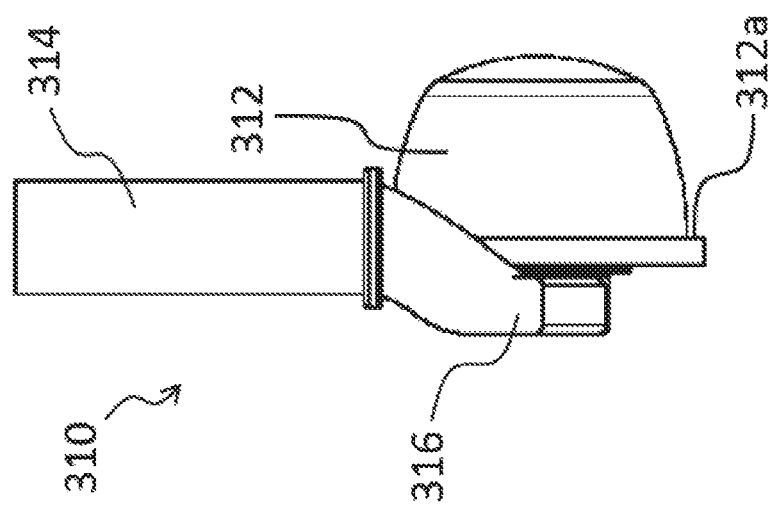
FIG. 6 shows a side view of a valve of the turbine according to the invention.

Furthermore, FIG. 5 shows the direction of flow 400 through the turbine housing 100. Accordingly, it is apparent from FIG. 5 that the first side conduit 112 exits in the direction of flow 400 in front of the connection area 130 from the first spiral 110 and reenters into the first spiral 110, after the connection area 130. Likewise, the second side conduit 122 exits the second spiral 120 in the direction of flow 400 in front of the connection area 130 and reenters into the second spiral 120 after the connection area 130 (see FIG. 4). As can also be readily recognized in FIG. 4 and partially also in FIG. 5, the first side conduit 112 and the second side conduit 122 are quasi-divided into two partial conduits 112*a*, 112*b* and 122*a*, 122*b*, respectively, wherein the corresponding first partial conduit 112*a*, 122*a* runs from the first and second spiral 110, 120, respectively, to the connection area 130, and the corresponding second partial conduit 112*b*, 122*b* runs back from the connection area 130 into the first and the second spiral 110, 120, respectively. Accordingly, in other words, in the turbine housing 100 according to the invention a special overflow area is shaped in the connection area 130 which comprises two inflow conduits (partial conduits 112*a* and 122*a*) and two outflow conduits (partial conduits 112*b* and 122*b*), wherein each of the two spirals 110, 120 is coupled to an inflow conduit and to an outflow conduit. The inflow conduits and the outflow conduits empty into the connection area 130 and the overflow area, respectively, so that, on the whole, an X-shaped conduit area is created for the overflow from the first spiral 110 into the second spiral 120 and in the inverse direction. Such a conduit guidance optimizes the flow course for the overflow area as well as the introduction and the removal of the exhaust gases in the overflow area.

Figure 3:
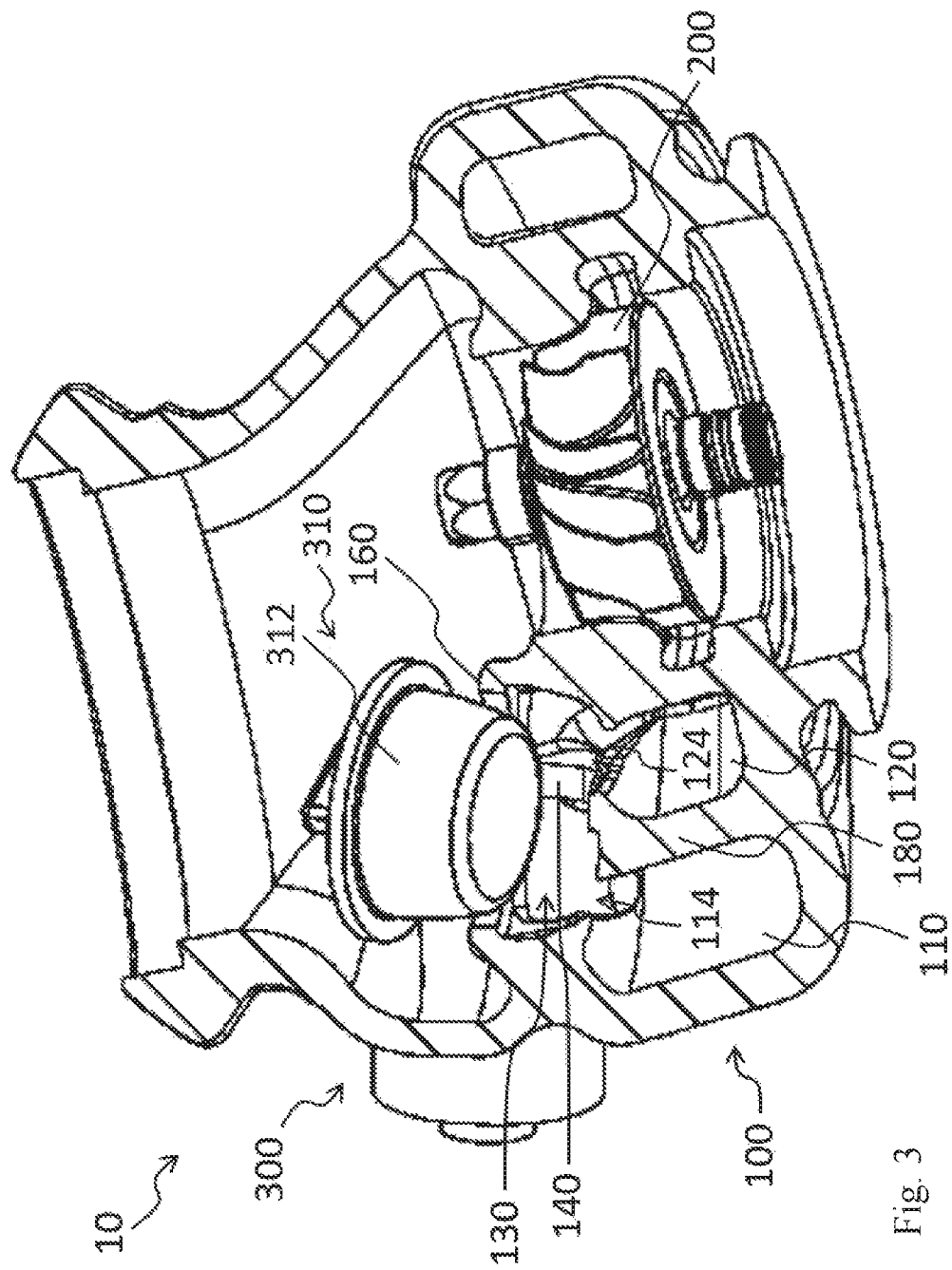
FIG. 3 shows a sectional view of the turbine housing according to the invention and of the turbine according to FIG. 1, respectively.

In the examples of FIG. 4 and FIG. 5, the first side conduit 112 and the second side conduit 122 are separated at least partially by a housing part of the turbine housing 100 from the first spiral 110 and the second spiral 120. That is, at least a part of the side conduits 112, 122 (or a part of the corresponding side conduits 112a, 112b and 122a, 122b) runs through a housing wall of the turbine housing 100 in a separated manner next to the first and the second spirals 110, 120. Alternatively, the first side conduit 112 and/or the second side conduit 122 can be fluidically connected along their entire length through the first spiral 110 and/or the second spiral 120. In other words, the first and the second side conduits 112, 122 do not run completely separated from the first and the second spirals 110, 120, in this exemplary embodiment, but are rather designed to be connected to each other to a certain extent, that is, open to one another. Such an exemplary embodiment is shown, for example, in FIG. 3. Perforations 114, 124 from the first spiral 110 and the second spiral 120, respectively, into the connection area 130, can be recognized here.

Figure 2:
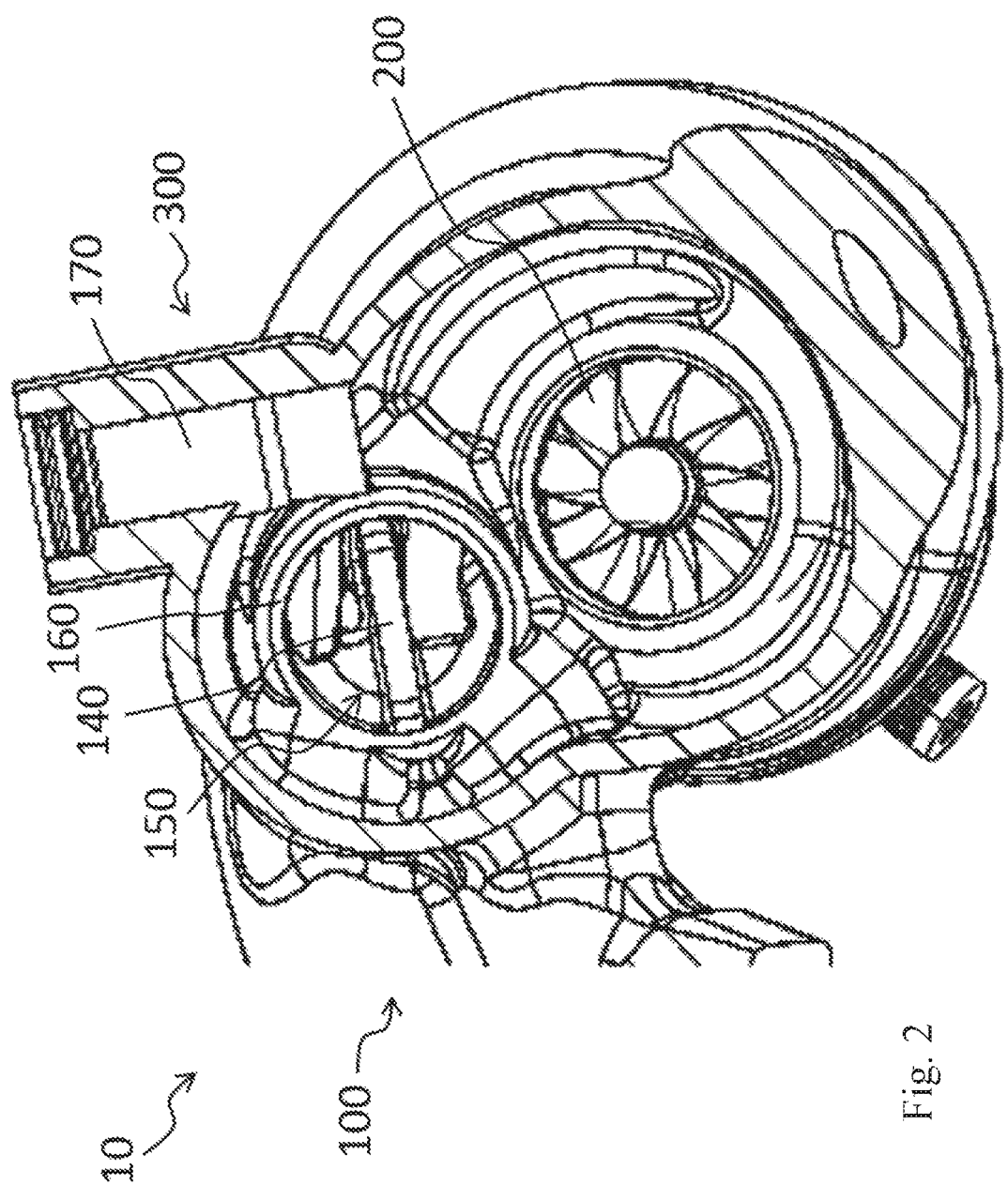
FIG. 2 shows a view with an enlarged partial section area of the turbine housing according to the invention and of the turbine according to the invention from FIG. 1, respectively.

As regards FIG. 2 and FIG. 3, a valve area 140 for receiving the valve closing body 312 is formed in the connection area 130. The regulated valve 310 with the valve closing body 312, which is arranged on or in the turbine housing 100, is designed to (approximately) open or close the fluidic connection in the connection area 130. In doing so, the shapes of the valve area 140 and of the valve closing body 312 are coordinated with one another. Depending on the kinetics of the valve 310, the valve 310 can entirely or only approximately close the fluidic connection in the connection area 130, that is, a small slot remains between the turbine housing 100 in the valve area 140 and the valve closing body 312. The valve 310 can regulate in a purposeful manner when and how much exhaust gas can flow from the first spiral 110 into the second spiral 120 and inversely. The valve area 140 is defined here by a web 180 of the turbine housing 100 which web separates the first spiral 110 from the second spiral 120 (see FIG. 3).

Referring further to FIG. 2 and FIG. 3, a bypass opening 150 is arranged in the connection area 130 (see also FIG. 4). The connection area 130 of the turbine housing 100 of the invention therefore serves not only as an overflow area between the two spirals 110, 120 but is simultaneously also part of a bypass arrangement 300 of the turbine housing 100 and the turbine 10, respectively. Therefore, it is advantageously possible to regulate both an overflow area between the two spirals 110, 120 and a bypass opening 150 with only a single valve 310 and a single actuator (not shown in the figures) for the valve 310. The bypass opening 150 is part of the bypass arrangement 300 through which the exhaust gases from the first and the second spirals 110, 120 can be conducted through the first and the second side conduits 112, 122 into the connection area 130 into the bypass formed by the bypass opening 150 in order to circumvent the turbine wheel 200 of the turbine 10. A valve seat 160 is formed around the bypass opening 150 (see FIG. 2 and FIG. 3). The valve seat 160 interacts with the valve closing body 312 of the regulated valve 310 in order to open and close the bypass opening 150 in a purposeful manner. In the closed state of the valve 310, the valve closing body 312 rests on the valve seat 160 and closes the bypass opening 150. In this position of the valve 310, even the overflow area in the connection area 130 is (almost) completely closed so that the first spiral 110 and the second spiral 120 which are (mostly) separated from one another are flowed through by exhaust gas.

As can be recognized in FIG. 1 and FIG. 2, the turbine housing 100 also comprises a through passage 170 for supporting the spindle 314 of the valve 310. Based on the special design of the turbine housing 100, the alignment of the through passage 170 can be selected relatively freely in comparison to known solutions. This means, for example, that the spindle 314 supported in the through passage 170 does not have to be arranged at a special angle relative to the flow direction 400 in the spirals. On the other hand, even the alignment of the spindle 314 can be freely selected relative to the valve closing body 312 since the movement plane of the spindle 314 is independent of the orientation of the closing body 312. This entails advantageous degrees of freedom for the design process of the turbine housing 100.

As can be recognized, for example, in FIG. 1, the multi-flow turbine 10 of the invention furthermore comprises a turbine wheel 200 as well as the already mentioned bypass arrangement 300. The bypass arrangement 300 comprises the valve 310. The valve 310 shown in FIG. 1, FIG. 3 and FIG. 5 to FIG. 7 is a flap valve. The valve 310 is explained in detail with reference made to FIG. 6 and FIG. 7. The valve 310 comprises the valve closing body 312 and the spindle 314. A lever arm 316 is arranged between the spindle 314 and the valve closing body 312. In particular, the lever arm 316 can be welded to the valve closing body 312. The lever arm 316 and the spindle 314 can be designed in one piece. The valve closing body 312 extends through the bypass opening 150 into the connection area 130 of the turbine housing 100, in the closed position of the valve 310, and interacts with the valve area 140 in order to eliminate an overflow of exhaust gases from the first spiral 110 into the second spiral 120. The valve closing body 312 has an annular sealing surface 312a which interacts with the valve seat 160 of the turbine housing 100, in the closed position of the valve 310, in order to close the bypass opening 150. In other words, the shape of the valve closing body 312 can be designated in the shown instance as quasi hat-shaped, wherein the hat brim forms the annular sealing surface 312a. However, the cross-sectional shape of the valve closing body 312 can also have a different shape, in the area of the sealing surface 312a, for example, oval/elliptic, or can have a completely freely defined shape in order to optimize the flow in the area around the valve 310 in the connection area 130. The valve seat 160 is then appropriately adapted. Furthermore, the valve closing body 312, as can be recognized in FIG. 7, can be constructed to be at least partially hollow. An elevation 320 which is, for example, cylindrical, extends in the hollow valve closing body 312 from the bottom of the valve closing body 312, which elevation is coupled at its upper end to the lever arm 316. The shape of the valve closing body 312 can be, for example, conical or spherical or a combination of conical and spherical. However, the valve closing body 312 can also have any other three-dimensional shape in order to optimize the flow course in the connection area 130 in the closed and/or partially open state of the valve 310. Furthermore, the valve closing body 312 shown in FIG. 7 comprises a projection 318 on a side facing away from the connection area 130 in the built-in state. The projection 318 can extend, for example, orthogonally relative to the hat brim from one side of the valve closing body 312 facing away from the connection area 130. During the assembly of the valve 310, the projection 318 acts as a stop for the lever arm 316. In this function, the projection 318 serves, on the one hand, for the correct positioning in the sense of determining the position of the valve closing body 312 relative to the lever arm 316 and accordingly relative to the spindle 314. On the other hand, the projection 318 helps during the connecting of the lever arm 316 to the valve closing body 312, for example, when the two structural components are welded to one another, to secure the position of the valve closing body 312 relative to the lever arm 316. During the assembly of the valve 300, the valve closing body 312 is set on the valve seat 160 and therefore into the connection area 130. The lever arm 316 is subsequently brought in position, wherein—during this step—the projection 318 sets and secures the position of the valve closing body 312 relative to the lever arm 316. Finally, the lever arm 316 is loaded via the spindle 314 with a closing force. In this position the lever arm 316 is then welded to the valve closing body 312. The projection 318 therefore facilitates the assembly and prevents assembly errors.

In particular, the actuator of turbine 10 can be designed in such a manner that the valve 310 can be continuously adjusted from a closed position into an open position. A freed overflow surface changes in the connection area 130 as a function of the position of the valve 310, that is, of the opening angle of the valve 310, in order to make possible an overflow between the first and the second spiral 110, 120 as well as a freed bypass surface of the bypass opening 150 in order to conduct exhaust gas past the turbine wheel 200. The overflow surface and the bypass surface can be indicated as a percentage value which indicates the ratio of the overflow surface and/or of the bypass surface to a cross-sectional surface of the partial conduit 112a and 122a. The cross-sectional surface is measured at an interval in the range of 19 to 25 mm, in particular 20 to 24 mm, preferably 21 to 23 mm, for example, ca. 22 mm from the outlet of the first and/or second side conduit 112, 122 from the first and second spiral 110, 120, respectively. That is, the cross-sectional surface is measured after 19 to 25 mm, in particular 20 to 24 mm, preferably 21 to 23 mm, for example, ca. 22 mm after the beginning of the partial conduit 112a and 122a. The distance refers here to a distance along an imaginary middle line of the partial conduit 112a and 122a, respectively. The position of the cross-sectional surfaces of the partial conduits 112a, 122a, which is referred to for the indication of the values for their relationship to the overflow surface and to the bypass surface, is indicated in FIG. 4 by the dotted lines 113. The cross-sectional surfaces of the partial conduits 112a, 122a are mostly equally large in this area, for which reason the values indicated in the following are based on the ratio of the overflow surface or the bypass surface and the cross-sectional surface of one of the partial conduits 112a and 122a.

At a 5° opening angle of the valve 310, the percentage ratio of the overflow surface relative to the cross-sectional surface of the partial conduit 112a and 122a, respectively, can be between 15% and 45%, in particular between 20% and 40%, preferably between 25% and 35%. At a 15° opening angle of the valve 310, the percentage ratio of the overflow surface relative to the cross-sectional surface of the partial conduit 112a and 122a, respectively, can be between 65% to 95%, in particular between 70% and 90%, preferably between 75% and 85%. At a 25° opening angle of the valve 310, the percentage ratio of the overflow surface relative to the cross-sectional surface of the partial conduit 112a and 122a, respectively, can be between 110% and 140%, in particular between 115% and 135%, preferably between 120% and 130%.

At a 5° opening angle of the valve 310, the percentage ratio of the bypass surface relative to the cross-sectional surface of the partial conduit 112a and 122a, respectively, can be between 5% and 25%, in particular between 10% and 20%, preferably between 12% and 18%. At a 15° opening angle of the valve 310, the percentage ratio of the bypass surface relative to the cross-sectional surface of the partial conduit 112a and 122a, respectively, can be between 10% and 30%, in particular between 15% and 25%, preferably between 17% and 23%. At a 25° opening angle of the valve 310, the percentage ratio of the bypass surface relative to the cross-sectional surface of the partial conduit 112a and 122a, respectively, can be between 30% and 50%, in particular between 35% and 45%, preferably between 37% and 43%.

Furthermore, the invention comprises a multi-flow turbocharger with the compressor and a previously described turbine 10 with the turbine housing 100 according to the invention.

Although the present invention was described above and is defined in the appended claims, it should be understood that the invention can also be alternatively defined according to the following embodiments:

A turbine housing (100) for a multi-flow turbine (10) with a first spiral (110); a second spiral (120); characterized in that the first spiral (110) has a first side conduit (112) and the second spiral (120) has a second side conduit (122), wherein the first side conduit (112) and the second side conduit (122) are fluidically connected to one another in a connection area (130).

The turbine housing according to embodiment 1, characterized in that the first side conduit (112) exits in the direction of flow in front of the connection area (130) out of the first spiral (110) and reenters into the first spiral (110) after the connection area (130); and the second side conduit (122) exits in the direction of flow in front of the connection area (130) out of the second spiral (120) and reenters into the second spiral (120) after the connection area (130).

The turbine housing according to embodiment 1 or embodiment 2, characterized in that the first side conduit (112), the second side conduit (122) and the connection area (130) together form an X-shaped conduit area in the turbine housing (10).

The turbine housing according to any one of the previous embodiments, characterized in that the first side conduit (112) and/or the second side conduit (122) are separated at least partially by a housing part of the turbine housing (100) from the first spiral (110) and/or from the second spiral (120).

The turbine housing according to any one of the previous embodiments, characterized in that a valve area (140) for receiving a valve closing body (312) is formed in the connection area (130).

The turbine housing according to any one of the previous embodiments, characterized in that a bypass opening (150) is arranged in the connection area (130).

The turbine housing according to embodiment 6, characterized in that a valve seat (160) is constructed around the bypass opening (150).

The turbine housing according to any one of the previous embodiments, characterized in that the turbine housing (100) furthermore comprises a through passage (170) for supporting a spindle (314) of a valve (310).

A multi-flow turbine (10) for an exhaust gas turbocharger with a turbine wheel (200); and a bypass arrangement (300); characterized by a turbine housing (100) according to any one of the previous embodiments.

The multi-flow turbine according to embodiment 9, characterized in that the bypass arrangement (300) comprises a valve (310), in particular wherein the valve (310) is a flap valve. The multi-flow turbine according to embodiment 10, characterized in that the valve (310) comprises a valve closing body (312) and a spindle (314).

The multi-flow turbine according to embodiment 11, characterized in that a lever arm (316) is arranged between the spindle (314) and the valve closing body (312), in particular wherein the lever arm (316) is welded to the valve closing body (312).

The multi-flow turbine according to embodiment 11 or embodiment 12, characterized in that the valve closing body (312) extends—in a closed position of the valve (310)—through a bypass opening (150) into the connection area (130) of the turbine housing (100) and interacts with a valve area (140) in order to suppress an overflow of exhaust gases from the first spiral (110) into the second spiral (120).

The multi-flow turbine according to any one of embodiments 11 to 13, characterized in that the valve closing body (312) has an annular sealing surface (312*a*) which interacts—in the closed position of the valve (320)—with a valve seat (160) of the turbine housing (100) in order to close the bypass opening (150).

The multi-flow turbine according to any one of embodiments 11 to 14, characterized in that the valve closing body (312) is constructed to be partially hollow.

The multi-flow turbine according to any one of embodiments 11 to 15, characterized in that the valve closing body (312) comprises a projection (318) on a side facing away from the connection area (130).

The multi-flow turbine according to any one of embodiments 10 to 16, characterized in that the valve (310) can be continuously adjusted from a closed position to an open position.

The multi-flow turbine according to any one of embodiments 10 to 17, characterized in that the bypass arrangement (300) also comprises an actuator for actuating the valve (310).

A multi-flow turbocharger with a compressor; and a turbine according to any one of embodiments 9 to 18.

The invention claimed is:

1. A turbine housing (100) for a multi-flow turbine (10) with
    a first spiral (110);
    a second spiral (120);
    wherein the first spiral (110) has a first side conduit (112) and the second spiral (120) has a second side conduit (122), wherein the first side conduit (112) and the second side conduit (122) are fluidically connected to one another in a connection area (130) and
    wherein the first side conduit (112) exits in a direction of flow in front of the connection area (130) out of the first spiral (110) and reenters into the first spiral (110) after the connection area (130); and
    the second side conduit (122) exits in a direction of flow in front of the connection area (130) out of the second spiral (120) and reenters back into the second spiral (120) after the connection area (130).

2. The turbine housing according to claim 1, wherein the first side conduit (112), the second side conduit (122) and the connection area (130) form an X-shaped conduit area together in the turbine housing (10).

3. The turbine housing according to claim 1, wherein the first side conduit (112) and/or the second side conduit (122) are separated at least partially by a housing part of the turbine housing (100) from the first spiral (110) and/or from the second spiral (120).

4. The turbine housing according to claim 1, wherein a valve area (140) for receiving a valve closing body (312) is formed in the connection area (130).

5. The turbine housing according to claim 1, wherein a bypass opening (150) is arranged in the connection area (130).

6. A multi-flow turbine (10) for an exhaust gas turbocharger with
    a turbine wheel (200); and
    a bypass arrangement (300);
    having a turbine housing (100) according to claim 1.

7. The multi-flow turbine (10) according to claim 6, wherein the bypass arrangement (300) comprises a valve (310).

8. The multi-flow turbine (10) according to claim 7, wherein the valve (310) comprises a valve closing body (312) and a spindle (314); and
    wherein a lever arm (316) is arranged between the spindle (314) and the valve closing body (312).

9. The multi-flow turbine (10) according to claim 8, wherein the valve closing body (312) extends in a closed position of the valve (310) through a bypass opening (150) into the connection area (130) of the turbine housing (100) and interacts with a valve area (140) in order to suppress an overflow of exhaust gases from the first spiral (110) into the second spiral (120).

10. The multi-flow turbine according to claim 8, wherein the valve closing body (312) has an annular sealing surface (312*a*) which interacts, in a closed position of the valve (320), with a valve seat (160) of the turbine housing (100) in order to close the bypass opening (150).

11. The multi-flow turbine according to claim 8, wherein the valve closing body (312) is constructed to be partially hollow.

12. The multi-flow turbine according to claim 8, wherein the valve closing body (312) comprises a projection (318) on a side facing away from the connection area (130).

13. The multi-flow turbine (10) according to claim 8, wherein the lever arm (316) is welded to the valve closing body (312).

14. The multi-flow turbine (10) according to claim 7, wherein the valve (310) is a flap valve.

15. The multi-flow turbine (10) according to claim 7, wherein the valve (310) can be continuously adjusted from a closed position to an open position.

16. A multi-flow turbocharger with
    a compressor; and
    a turbine according to claim 6.

* * * * *